Aug. 20, 1929.    A. B. CROSS ET AL    1,725,732
ELECTRIC WINDSHIELD HEATER
Filed Feb. 28, 1928
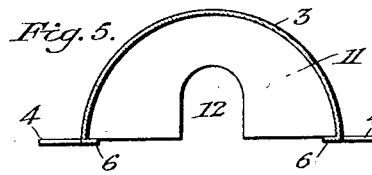
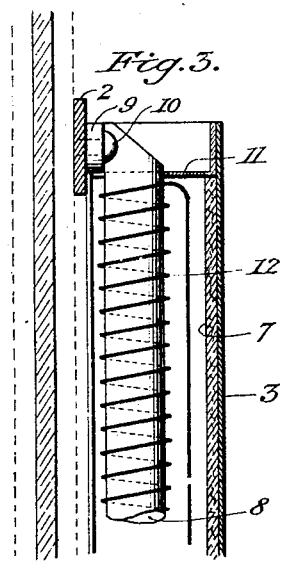
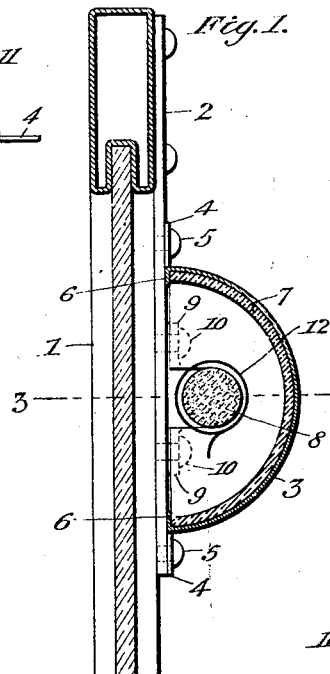
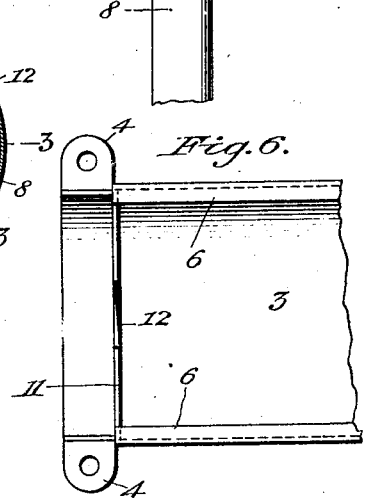
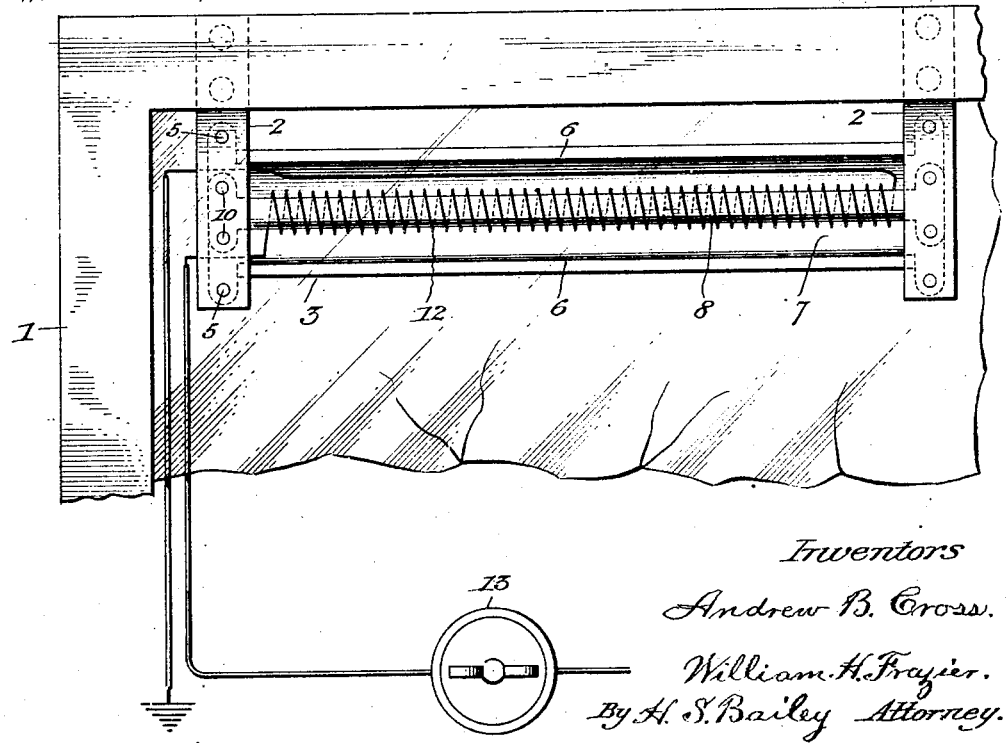
Inventors
Andrew B. Cross.
William H. Frazier.
By H. S. Bailey Attorney.

Patented Aug. 20, 1929.

1,725,732

UNITED STATES PATENT OFFICE.

ANDREW B. CROSS AND WILLIAM H. FRAZIER, OF DENVER, COLORADO.

ELECTRIC WINDSHIELD HEATER.

Application filed February 28, 1928. Serial No. 257,693.

Our invention relates to an electric windshield heater, and the objects of our invention are:—

First, to provide an electric current operated and motor vehicle supported windshield heating device that will heat a windshield hot enough and keep it hot enough in cold stormy weather to prevent frost, or sleet, or snow from forming on or sticking to and accumulating on the windshield.

Second, to provide a simple, inexpensive, attachable and detachable heater for windshields that receives its electric current from the electric battery of the motor vehicle and is of small compact form and that can be secured in position to heat a windshield either along its whole length or along any predetermined part of its length, and that can be firmly and rigidly attached to the motor vehicle without weakening or marring the parts thereof to which it is secured.

Third, to provide an electric heater that can be applied to the windows of the cabs of locomotive engines and that will keep them clear of sleet and snow when driving head into a snow storm blizzard, and that can also be applied to front sidewalk show windows of retail stores, that often become wholly or partially covered with frost.

We attain these objects by the mechanism illustrated in the accompanying drawings, in which:—

Figure 1 is a cross sectional view through our electric heater supported in an automobile in operative relation to a windshield which is also shown in section.

Figure 2 is a side view, the front side of the electric heater showing the nonconductive rod form of core on which the current resistance wire is wound and the nonconductive heat radiating semicircular shaped back member of the heater and the semicircular shaped metal casing on which the members of the heater are secured.

Figure 3 is a sectional view through one end portion of the heater, on the line 3, 3 of Figure 1.

Figure 4 is a front view of one end portion of the core.

Figure 5 is a transverse sectional view through the heat reflecting casing, and

Figure 6 is a front view of one end portion of the casing.

Similar letters of reference refer to similar parts throughout the several views.

Referring to the drawings, the numeral 1 designates a portion of an automobile wind shield, which is of the usual construction. To the upper bar of the wind shield frame, and on the side facing the steering wheel, are secured two metal vertical strips or brackets 2, which are preferably about eighteen inches apart, and extend a short distance below the bar and close to the glass and these strips or brackets support the improved heater, which is arranged as follows: To the brackets 2 is secured the heat reflecting casing 3 of the heater, which is semicircular in cross section and preferably about eighteen inches in length, though it may be longer or shorter, as desired. This casing is open on the side next the glass and may be made of any suitable sheet metal and apertured ears 4 are formed on each end thereof through which screws 5 are passed for securing the casing to the brackets 2. The longitudinal edges of the casing are bent inward at right angles to form narrow flanges 6, which serve to hold an asbestos heat insulating sheet 7, which fits within the casing so as to conform to the curvature thereof, its long edges resting against the said flanges, as clearly shown in Figure 1. A core 8 extends centrally through the casing from end to end, and its ends are formed with apertured ears 9 for attachment to the brackets 2 by screws 10. This core is made of suitable nonconducting material, such as wood fibre, and is in the form of a rod which is round in cross section. The ends of the casing are closed by plates 11, having central openings 12 through which the ends of the core project, as shown in Figure 3, and around the core is wound a resistance coil of wire 12, one terminal of which is grounded, and the other terminal for convenience, may be connected with the usual ammeter, so that the current from the battery, passing through the ammeter will also pass through the resistance coil 12, which will thereby be heated, and the heat will be reflected against the wind shield by the casing 3, whereby this portion of the wind shield will be heated, sufficiently to prevent snow or sleet from collecting thereon, thus affording clear, unobstructed vision through the wind shield at all times, during rainy or sleety weather. A switch 13 is interposed in that terminal of the coil leading to the ammeter, so that the coil 12 may be cut out of the battery circuit when not required.

While but a single arrangement of the construction of the improved heater and the manner of its attachment to the wind shield is shown, it will be apparent that changes both in its construction and manner of attachment can be made without departing from the spirit of the invention.

Having described our invention, what we claim as new and desire to secure by Letters Patent, is:

In a heating device of the character described, the combination with a non-conducting core having apertured attachment ears on its ends, and a resistance coil surrounding said core having terminals adapted to connect with a current source; of a heat reflecting housing over said core which is semi-circular in cross section and provided at its ends with apertured attachment ears, its longitudinal edges terminating in narrow introverted flanges; a heat resisting lining in said housing, the longitudinal edges of which bear against said flanges, and end plates in said housing having openings through which the ends of said core project.

In testimony whereof, we affix our signatures.

ANDREW B. CROSS.
WILLIAM H. FRAZIER.